United States Patent
Burgardt et al.

(10) Patent No.: US 7,690,278 B2
(45) Date of Patent: Apr. 6, 2010

(54) STEP VARIABLE TRANSMISSION FOR A MOTOR VEHICLE

(75) Inventors: Georg Burgardt, Bretzfeld (DE); Reinhard Schaarschmidt, Illingen (DE); Stefan Kapp, Walheim (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 263 days.

(21) Appl. No.: 11/750,956

(22) Filed: May 18, 2007

(65) Prior Publication Data

US 2007/0277633 A1 Dec. 6, 2007

Related U.S. Application Data

(63) Continuation of application No. PCT/EP2005/012098, filed on Nov. 11, 2005.

(30) Foreign Application Priority Data

Nov. 23, 2004 (DE) .................. 10 2004 056 936

(51) Int. Cl.
F16H 3/08 (2006.01)
(52) U.S. Cl. ........................................ 74/331
(58) Field of Classification Search ........... None
See application file for complete search history.

(56) References Cited

U.S. PATENT DOCUMENTS

| | | | | |
|---|---|---|---|---|
| 4,033,200 A | * | 7/1977 | Stockton | 475/206 |
| 4,476,737 A | * | 10/1984 | Young | 74/358 |
| 4,738,150 A | * | 4/1988 | Miner | 74/359 |
| 4,802,373 A | * | 2/1989 | Saint-Jean et al. | 74/359 |
| 5,311,789 A | * | 5/1994 | Henzler et al. | 74/331 |
| 5,704,247 A | * | 1/1998 | Ahluwalia et al. | 74/331 |
| 5,927,145 A | * | 7/1999 | Ahluwalia et al. | 74/331 |
| 6,067,870 A | * | 5/2000 | Fleishman et al. | 74/331 |
| 6,250,171 B1 | | 6/2001 | Sperber | |
| 6,634,247 B2 | | 10/2003 | Pels et al. | |
| 6,931,956 B2 | * | 8/2005 | Thery | 74/325 |
| 7,044,013 B2 | * | 5/2006 | Ahrens | 74/331 |
| 7,082,850 B2 | * | 8/2006 | Hughes | 74/329 |
| 7,225,695 B2 | * | 6/2007 | Gumpoltsberger et al. | 74/325 |
| 7,225,696 B2 | * | 6/2007 | Gitt | 74/340 |

(Continued)

FOREIGN PATENT DOCUMENTS

DE 34 43 504 A1 6/1985

(Continued)

OTHER PUBLICATIONS

PCT International Search Report, PCT/EP2005/12098, Nov. 11, 2005.

*Primary Examiner*—Dirk Wright
(74) *Attorney, Agent, or Firm*—Knobbe, Martens, Olson & Bear, LLP

(57) ABSTRACT

A step variable transmission for a motor vehicle has a plurality of forward gear stages and at least one reverse gear stage. The transmission comprising: a drive input shaft arrangement, a drive output shaft arrangement, and a plurality of wheel sets which have loose wheels and shift wheels, wherein the shift wheels are rotatably mounted on a shaft arrangement and can be rotationally fixedly connected to the associated shaft arrangement by means of respective shift clutches.

21 Claims, 8 Drawing Sheets

U.S. PATENT DOCUMENTS

| | | |
|---|---|---|
| 7,305,900 B2 * | 12/2007 | Suzuki et al. ................. 74/340 |
| 7,340,973 B2 * | 3/2008 | Hiraiwa ....................... 74/330 |
| 7,383,749 B2 * | 6/2008 | Schafer et al. ................ 74/340 |
| 2004/0162180 A1 | 8/2004 | Tsberger |
| 2004/0200300 A1 * | 10/2004 | Ahrens ........................ 74/331 |
| 2007/0107542 A1 | 5/2007 | Gumpoltsberger |

FOREIGN PATENT DOCUMENTS

| | | |
|---|---|---|
| DE | 198 21 164 A1 | 11/1999 |
| DE | 198 60 251 C1 | 11/2000 |
| DE | 101 33 695 A1 | 3/2002 |
| DE | 103 05 639 A1 | 3/2004 |
| DE | 102 53 259 A1 | 5/2004 |
| DE | 103 05 241 A1 | 9/2004 |
| DE | 103 05 242 A1 | 9/2004 |
| EP | 0 046 373 A1 | 2/1982 |
| EP | 0 083 747 A2 | 7/1983 |
| EP | 0 288 779 A2 | 2/1988 |
| EP | 1 124 079 A2 | 8/2001 |
| FR | 2 837 251 A1 | 9/2003 |

* cited by examiner

STEP VARIABLE TRANSMISSION FOR A MOTOR VEHICLE

CROSS-REFERENCE TO RELATED APPLICATIONS

This is a Continuation application of the International patent application PCT/EP2005/012098, filed Nov. 11, 2005, claiming the priority of German patent application DE 10 2004 056 936, filed Nov. 23, 2004.

BACKGROUND OF THE INVENTION

The present invention relates to a step variable transmission for a motor vehicle, wherein the step variable transmission has a plurality of forward gear stages and at least one reverse gear stage.

The present invention more precisely relates to an automatic step variable transmission in which the engagement and disengagement of gear stages is carried out by means of actuators. Selector drums, which are driven electromotively, hydraulic linear actuators, etc. can be used as actuators.

The present invention relates in particular to twin-clutch transmissions and automatic shift transmissions.

Twin-clutch transmissions are for example known from the documents DE 198 21 164 A1, EP0 083 747 A2, EP0 046 373 A1.

Automatic shift transmissions are provided in the Smart®, in the BMW® M3 and in the recently introduced BMW® M5. The latter involves a 7-gear automatic shift transmission. Said automatic shift transmission has a wheel set arrangement which does not follow the conventional H-pattern. In particular, shift clutch packs which have two shift clutches are assigned to not directly successive gears. Since the shift clutch packs have separate actuators in each case, the disengagement of a source gear and the engagement of a target gear can take place with a certain time overlap, so that gear changes can be carried out very quickly.

In twin-clutch transmissions, the forward gears are divided between two partial transmissions. Here, it is generally the case that odd gears are assigned to one partial transmission and even gears are assigned to the other partial transmission. Each partial transmission is connected by means of a separate clutch to the drive output shaft of the drive motor. With a twin-clutch transmission, gear changes can be carried out without an interruption in tractive force by means of overlapping actuation of the two clutches.

The two transmissions types (twin-clutch transmission and automatic shift transmission) however still do have room for improvement.

BRIEF SUMMARY OF THE INVENTION

It is accordingly the object of the present invention to specify an improve step variable transmission for a motor vehicle.

Said object is achieved by means of a step variable transmission for a motor vehicle, wherein the step variable transmission has a plurality of forward gear stages and at least one reverse gear stage, having a drive input shaft arrangement, an output shaft arrangement, and a plurality of wheel sets which have loose wheels and shift wheels, wherein the loose wheels are rotatably mounted on a shaft arrangement and can be rotationally fixedly connected to the associated shaft arrangement by means of respective shift clutches.

The step variable transmission is preferably a twin-clutch transmission, wherein the drive input shaft arrangement has a first and a second drive input shaft which are assigned to a first and a second partial transmission respectively, and wherein the first partial transmission is assigned odd forward gear stages and the second partial transmission is assigned even gear stages.

In the twin-clutch transmission of said type, it is particularly preferable if the forward gear stage which is used predominantly for starting the motor vehicle in the forward direction and the reverse gear stage are assigned to different partial transmissions.

The forward gear stage which is used predominantly for starting the motor vehicle is generally the first gear. As a result of the assignment to in each case a different partial transmission, it is not necessary to shift between the gear stages in the event of changes in the traveling direction. In other words, were the starting gear stage and the reverse gear stage assigned to the same partial transmission, it would be necessary in the event of a change in the traveling direction to always initially disengage the one gear stage and engage the other gear stage. This leads to undesirably long gear change times in particular in the so called free-rocking mode in the event of a vehicle becoming stuck.

According to the preferred embodiment, in contrast, no shift or synchronizing processes which would load the shift clutches (synchronizations) are necessary. Starting processes in the forward direction and in the reverse direction are also generally carried out with different transmission-input-side starting clutches. Accordingly, the two starting clutches of the twin-clutch transmission are loaded more uniformly.

When starting the motor vehicle, the reverse gear stage and the starting forward gear stage are preferably engaged at the same time. This improves the capability of the transmission for cold shifting since, for starting in any direction, no engagement process need be carried out while the transmission is at rest.

According to a further preferred embodiment, the drive input shaft arrangement has a single drive input shaft.

In said embodiment, the step variable transmission is for example an automatic shift transmission.

It is advantageous overall if the drive output shaft arrangement has two drive output shafts which, together with the drive input shaft arrangement, form a 3-shaft arrangement.

Step variable transmissions of said type can be of particularly compact design in the axial direction.

Here, in a twin-clutch transmission, the forward gear stages of a partial transmission can be distributed between the two drive output shafts.

The "assignment" of a gear stage to a drive output shaft means that the shift clutch which serves to engage and disengage said gear stage is mounted on said driveshaft.

Here, it is particularly advantageous if a certain forward gear stage is assigned to one drive output shaft of the output drive shafts and if the reverse gear stage is assigned to the other drive output shaft.

It is particularly advantageous here if the reverse gear stage is driven via the certain forward gear stage.

In said embodiment, the fact that two drive output shafts are provided is utilized to realize the rotational direction reversal required for the reverse gear. In other words, in said embodiment, no further auxiliary shaft is required for mounting a rotational direction reversal wheel. The rotational direction reversal takes place here in that the rotational direction is initially reversed by means of the certain forward gear stage.

It is particularly advantageous here if the reverse gear stage is driven directly via the certain forward gear stage.

In said embodiment, no further gearwheel is required for rotational direction reversal.

In an alternative embodiment, the reverse gear stage is driven via a wheel which is rotationally fixedly connected to a loose wheel of a wheel set which is assigned to the certain forward gear stage.

In said embodiment, the loose wheel of the certain forward gear stage is therefore rotationally fixedly connected to the further wheel. As a result of said measure, the transmission ratio for the reverse gear stage can be freely selected in wide ranges.

It is also advantageous if a parking lock is assigned to one of the drive output shafts.

This firstly has the advantage that the accommodation of the parking lock requires only a small amount of installation space. In particular, no separate parking lock shaft is required. The arrangement of the parking lock on a differential gearing which is connected downstream would be also generally more structurally complex, requires more add-on parts and increases costs. In addition, a parking lock on the differential gearing would require a more massive design, since the torques introduced there by the drive output are higher than on one of the drive output shafts.

In other words, the torques or forces acting on the parking lock are reduced, specifically corresponding to a drive output constant transmission ratio.

It is to be noted in this regard that the two drive output shafts of the embodiment according to the invention are generally connected to a differential gearing by means of a respective drive output constant wheel set.

By arranging the parking lock on one of the provided drive output shafts, the parking lock can be of smaller and more cost-effective design overall.

It is also particularly advantageous if the parking lock is aligned in the axial direction with a certain forward gear stage of the other drive output shaft.

Further installation space can be saved in this way.

It is particularly advantageous if the reverse gear stage is driven via a wheel which is rotationally fixedly connected to a loose wheel of a wheel set which is assigned to the certain forward gear stage. In this case, the additional axial length, on the one drive output shaft, for the further wheel on the other drive output shaft is so to speak "filled up" by the parking lock.

It is particularly advantageous overall if the certain forward gear stage is the second forward gear stage.

Since the reverse gear stage and the forward gear stage used for starting in the forward direction (generally the first gear) are preferably assigned to different partial transmissions, it is then not possible to drive the reverse gear stage by means of the first gear.

The second forward gear stage (the second gear) is therefore used for this purpose. It is hereby possible to still provide a sufficiently favorable transmission ratio for starting in reverse gear. It is possible in particular to realize a transmission ratio for the reverse gear which is close to that of the first gear.

According to a further preferred embodiment, in the twin-clutch transmission, two forward gear stages of the forward gear stages of one partial transmission are assigned to different drive output shafts, wherein said two forward gear stages share a common fixed wheel on the drive input shaft arrangement.

In said embodiment, a so-called "dual use" of the fixed wheel is realized. This brings about weight savings, installation space savings and cost savings. It is self-evident that the two working gear stages which are related by means of a common fixed wheel must have a certain transmission ratio relationship.

Although the realization of a single dual use generally entails the best comprise between functionality, costs and installation space, it is possible for in each case the two forward gear stages of the forward gear stages of the two partial transmissions to be assigned to different drive output shafts, wherein the respective two forward gear stages share in each case one common fixed wheel on the drive input shaft arrangement.

Two dual uses are therefore realized in said embodiment.

It is of course generally also conceivable to realize more than two dual uses.

According to a further preferred embodiment, the first forward gear stage (the first gear) and the second forward gear stage (the second gear) are assigned to one of the two drive output shafts.

In this way, the transfer of high torques from the first gear to the second gear and vice versa takes place without a change of drive output shaft. This has a positive effect on the noise and vibration generation of the transmission. There is no additional cost and installation space expenditure and no restriction to the functionality of the transmission.

It is also advantageous if the first forward gear stage is assigned to the drive output shaft with the shorter axle spacing.

This results in a small shift wheel diameter, which has a positive effect on the radial installation space for the axle shafts.

According to a further alternative embodiment, the drive output shaft arrangement has a single drive output shaft.

This provides a "classic" 2-shaft concept of a lay shaft reduction gearing design.

In said embodiment, the transmission has a greater overall axial length but is generally of more compact design in the radial direction.

It is advantageous overall if those wheel sets which are assigned to the forward gear stages which transmit high torques are arranged at the ends of the drive input shaft arrangement.

In other words, gears with a large shift wheel diameter are preferably situated at the drive output shaft ends. Gear stages with small shift wheel diameters are preferably arranged in between. This leads, in addition to the positive effect on the shaft bending, to so-called "package" advantages. The (hydraulic, pneumatic, electromechanical, etc.) shift actuating arrangement, preferably a selector drum actuating arrangement, can then be arranged, radially close to the drive output shafts, between the gears with large shift wheel diameters.

The step variable transmission can be embodied as a transmission with five or six forward gear stages or else as a transmission having more than six forward gear stages, for example as a 7-gear transmission. The above-stated advantages have a particularly pronounced effect in the case of a 6-gear transmission.

The beveling direction of the fixed wheels is preferably designed such that the reaction forces from the torque loading under traction act in the same direction as the clutch actuating forces, which are higher than said reaction forces. No axial movement of the drive input shafts therefore takes place in the event of transitions from traction to overrun, which has a positive effect on the controllability of the clutches.

It is possible overall according to the invention to provide compact, cost-effective, functionally high-quality and robust step variable transmissions.

It is self-evident that the features specified above and the features yet to be explained below can be used not only in the respectively specified combination but also in other combinations or individually without departing from the scope of the present invention.

DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
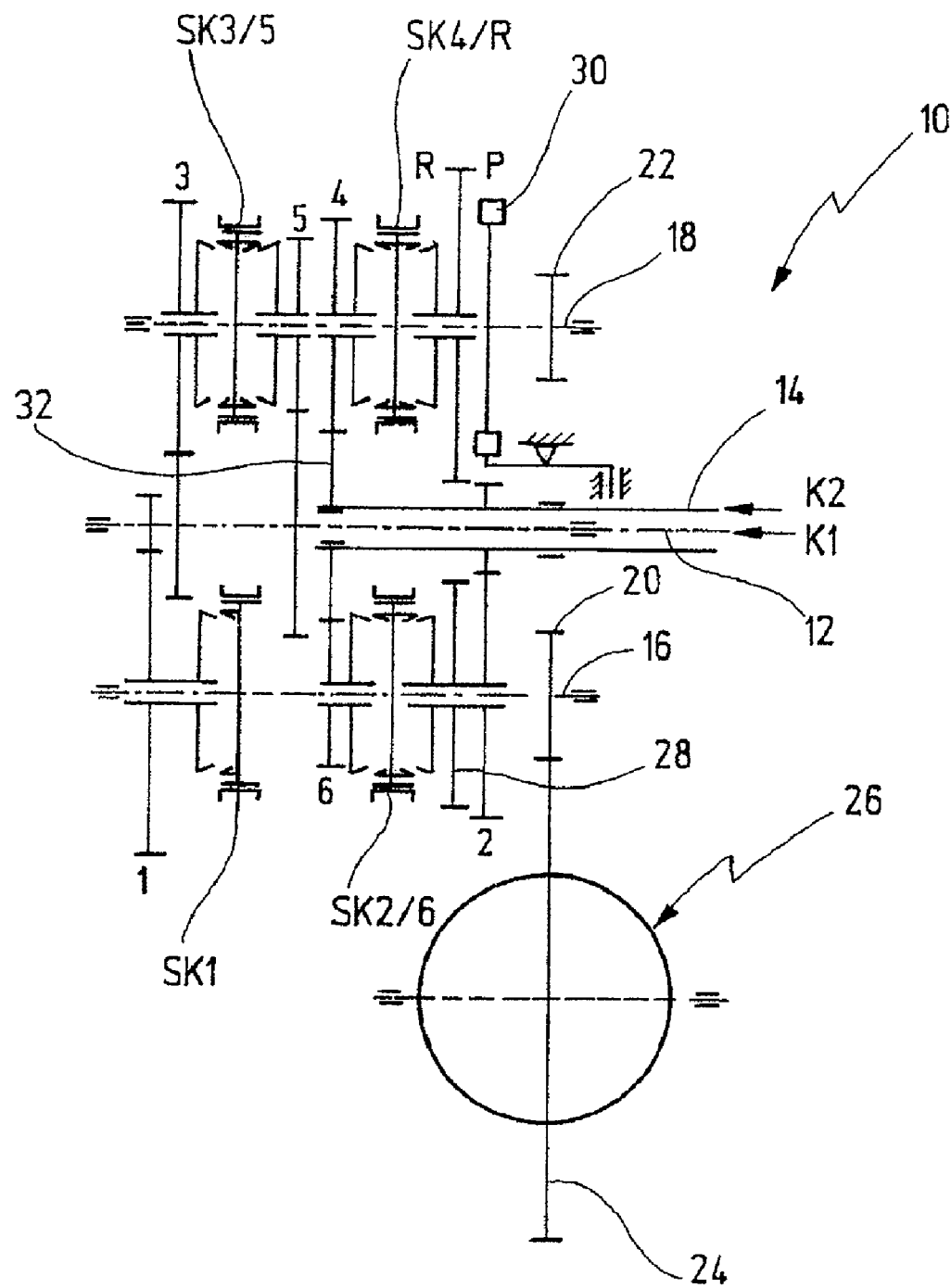
FIG. 1 shows a schematic wheel set diagram of a first embodiment of a twin-clutch transmission according to the invention.

In FIG. 1, a first embodiment of a twin-clutch transmission according to the invention is denoted generally by 10.

The twin-clutch transmission 10 has a first drive input shaft 12 and a second drive input shaft 14. The second drive input shaft 14 is embodied as a hollow shaft and is arranged concentrically with respect to the first drive input shaft 12.

The first drive input shaft 12 can be connected to a first clutch K1. The second drive input shaft 14 can be connected to a second clutch K2.

The first drive input shaft 12 extends over a greater axial extent than the second drive input shaft and projects beyond the latter.

The twin-clutch transmission 10 also has a first output shaft 16 and a second output shaft 18. The two output shafts 16, 18 are arranged in each case parallel to the drive input shafts 12, 14 and are connected, by means of a output constant wheel set, to a differential drive input wheel 24 of a differential gearing 26.

More precisely, the output constant wheel set has a first output wheel 20 which is rotationally fixedly connected to the first output shaft 16, and has a second output wheel 22 which is rotationally fixedly connected to the second output shaft 18.

Figure 2:
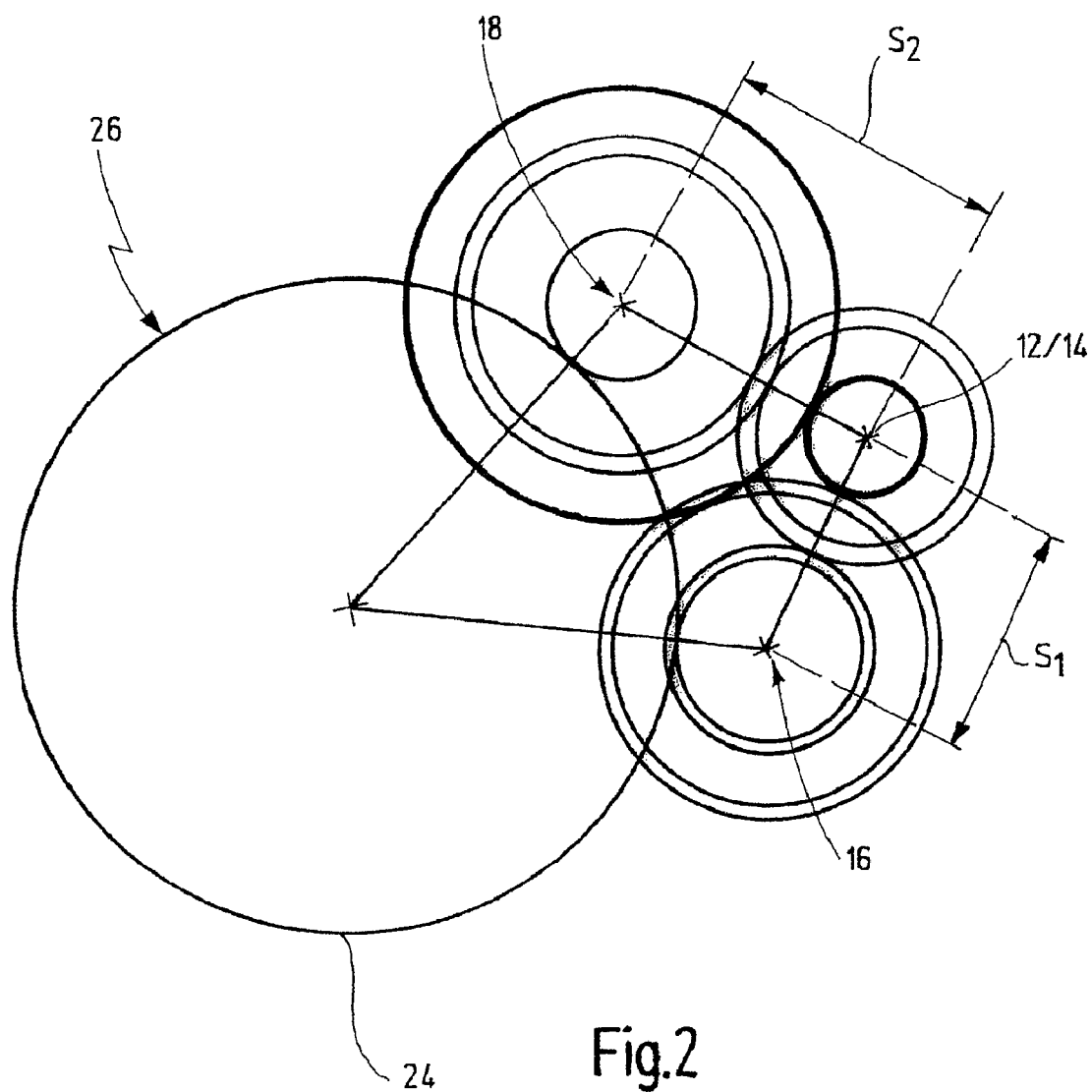
FIG. 2 shows a schematic cross-sectional view of the twin-clutch transmission of FIG. 1.

The two output wheels 20, 22 are aligned with one another axially and both engage with the differential drive input wheel 24, as can be seen in particular in FIG. 2.

The twin-clutch transmission 10 has six forward gear stages 1-6 and one reverse gear R. The odd forward gear stages 1, 3, 5 are assigned to a first partial transmission of the twin-clutch transmission 10 and therefore to the first clutch K1.

The even forward gear stages 2, 4, 6 and the reverse gear stage R are assigned to a second partial transmission of the twin-clutch transmission 10 and therefore to the second clutch K2.

The forward gear stages 1, 2 and 6 are assigned to the first drive output shaft 16. The forward gear stages 3, 4 and 5 and the reverse gear stage R are assigned to the second drive output shaft 18.

A shift clutch pack SK1 having one shift clutch is mounted on the first drive output shaft 16 and is assigned to the forward gear stage 1. A shift clutch pack SK2/6 having two shift clutches is assigned to the forward gears 2, 6. Correspondingly, a shift clutch pack SK3/5 having two shift clutches is assigned to the forward gear stages 3, 5 and a shift clutch pack SK4/R is assigned to the gear stages 4, R.

The shift clutches provided in the shift clutch packs SK are for example embodied as conventional synchronous clutches.

Arranged on the first output shaft 16, in this sequence proceeding from the transmission input, are: the first output wheel 20, the loose wheel for the forward gear stage 2, a rotational direction reversal wheel 28 for the reverse gear stage R, the shift clutch pack SK2/6, the loose wheel for the forward gear stage 6, the shift clutch pack SK1, and the loose wheel for the forward gear stage 1.

Correspondingly arranged on the second output shaft 18, in this sequence proceeding from the transmission input, are: the second output wheel 22, a parking lock 30, the loose wheel of the reverse gear stage R, the shift clutch pack SK4/R, the loose wheel for the forward gear stage 4, the loose wheel for the forward gear stage 5, the shift clutch pack SK3/5, and the loose wheel for the forward gear stage 3.

The rotational direction reversal wheel 28 and the loose wheel for the forward gear stage 2 are rotationally fixedly connected to one another. The rotational direction reversal wheel 28 is aligned axially with the loose wheel of the reverse gear stage R on the second output shaft 18. Correspondingly, the parking lock 30 is aligned axially with the loose wheel for the second forward gear stage 2 on the first drive output shaft 16.

In addition, the forward gear stages 4, 6 are aligned axially with one another and mesh with a common shift wheel 32. In other words, a dual use of the forward gear stages 4, 6 is realized.

In the transmission 10, the forward gear stage 1 and the reverse gear stage R are situated on different partial transmissions and are therefore assigned to different clutches K1 and K2.

The reverse gear stage R is driven via the rotational direction reversal wheel 28 of the forward gear stage 2, that is to say so to speak by means of the stepped second gear. Here, it is possible to realize a transmission ratio similar to that of the first gear.

The parking lock 30 is attached opposite the loose wheel or shift wheel of the forward gear stage 2.

One dual use is realized. The forward gear stages 1, 2 are situated on one output shaft, the output drive shaft 16. In total, four synchronous clutch packs SK are provided.

The forward gear stage 1 is situated on the output shaft 16 with the short axial spacing. The gear stages with a large shift or loose wheel diameter (in the present case, the stages 1 and 2 on the output shaft 16 and the gear stages 3 and R on the output shaft 18) are arranged axially at the outside, so that an actuating arrangement can be arranged in between, radially close to the output shafts 16, 18.

The twin-clutch transmission 10 is embodied as an automatic transmission. The shift clutch packs SK are connected to corresponding actuators. Correspondingly, the clutches K1 and K2 are also actuated automatically.

As shown in FIG. 2, the output shaft 16 has a shorter axial spacing S1 to the drive input shaft 12 than the axial spacing S2 of the second output shaft 18 to the drive input shaft 12.

Further embodiments of step variable transmissions according to the invention are described below. The embodiments of step variable transmissions according to the invention explained below are generally of a similar design to the transmission 10 of FIGS. 1 and 2. The following text therefore explains merely differences with respect to the embodiment of FIGS. 1 and 2. The description of the twin-clutch transmission 10 otherwise also relates to the embodiments explained below. Identical elements are therefore also provided with the same reference symbols.

Figure 3:
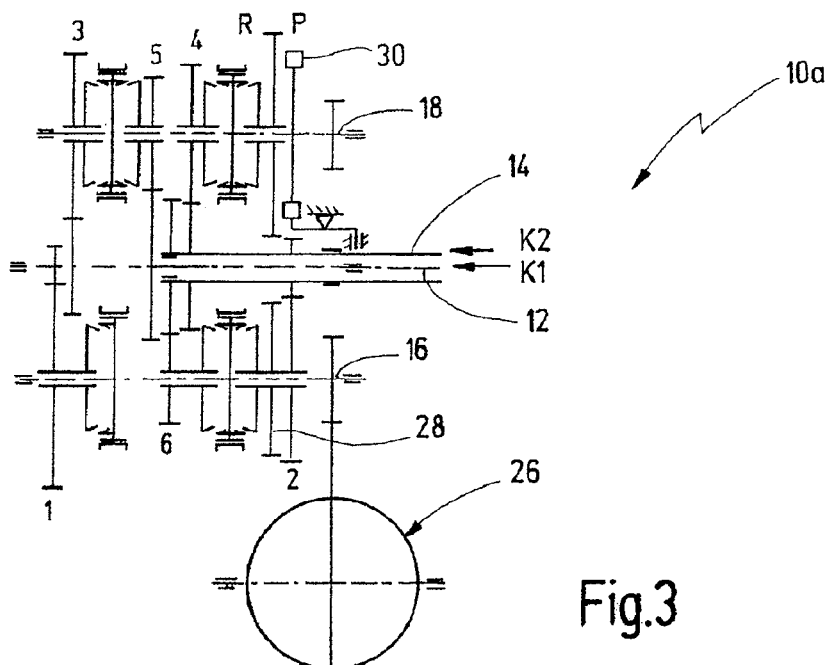
FIG. 3 shows a schematic wheel set diagram of a second embodiment of a differential gearing according to the invention.

FIG. 3 shows a second embodiment of a twin-clutch transmission 10a according to the invention.

In the embodiment of FIG. 3, the wheel sets of the forward gear stages 4 and 6 are not aligned axially with one another, and therefore no dual use is realized. This has the advantage that no restrictions in the transmission ratios are necessary. Furthermore, the transmission ratios are modularly variable, for example for variants of gasoline/diesel engines. There is a slight increase in length over the twin-clutch transmission 10 of FIG. 1.

Figure 4:
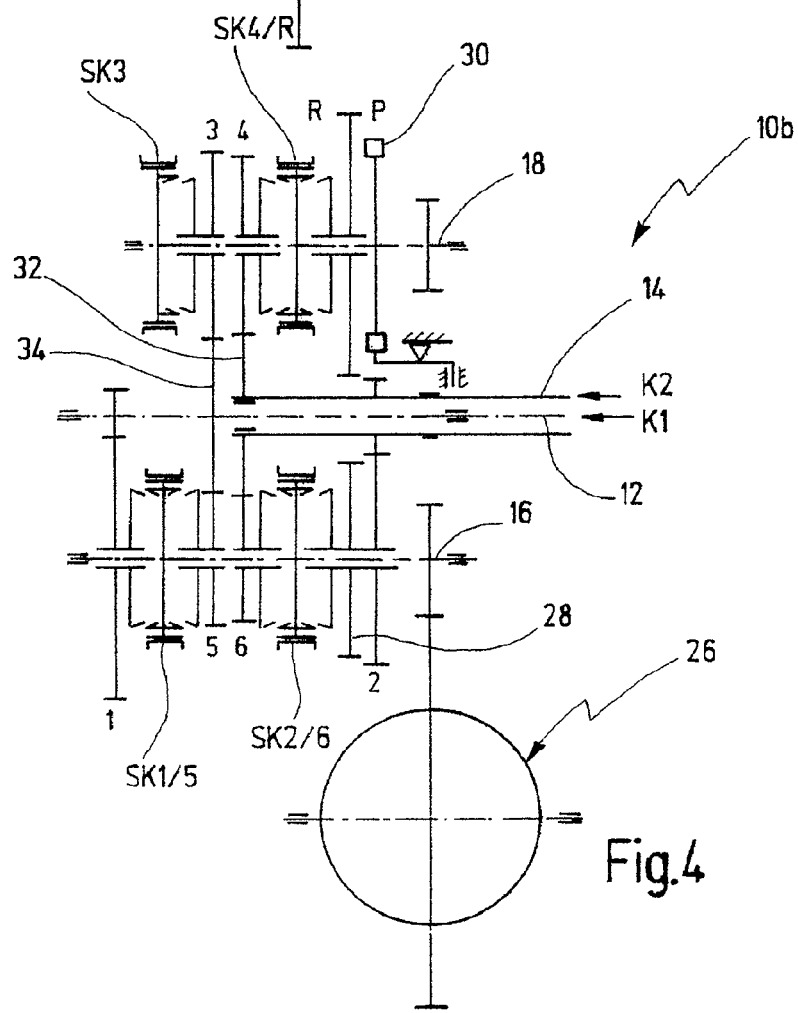
FIG. 4 shows a schematic wheel set diagram of a third embodiment of a differential gearing according to the invention.

FIG. 4 shows a further embodiment of a twin-clutch transmission 10b according to the invention.

In the twin-clutch transmission 10b, in contrast to the twin-clutch transmission 10 of FIG. 1, two dual uses are realized. More precisely, the forward gear stages 4, 6 and the forward gear stages 3, 5 are aligned axially with one another. The loose or shift wheels of the forward gear stages 3 and 5 thereby share a fixed wheel 34 on the first drive input shaft 12.

The axial sequence of the individual elements on the drive output shafts 16 and 18 has also changed here. Arranged on the first output shaft 16, in this sequence proceeding from the transmission input, are the following elements: the first output wheel 20, the loose wheel for the second forward gear stage, the rotational direction reversal wheel 28, the shift clutch pack SK2/6, the loose wheel of the forward gear stage 6, the loose wheel of the forward gear stage 5, the shift clutch pack SK1/5, and the loose wheel of the forward gear stage 1.

Correspondingly arranged on the second output shaft, in this sequence proceeding from the transmission input, are the following elements: the second output wheel 22, the parking lock 30, the loose wheel of the reverse gear stage R, the shift clutch pack SK4/R, the loose wheel of the forward gear stage 4, the loose wheel of the forward gear stage 3, and the shift clutch pack SK3 for the third forward gear stage.

Figure 5:
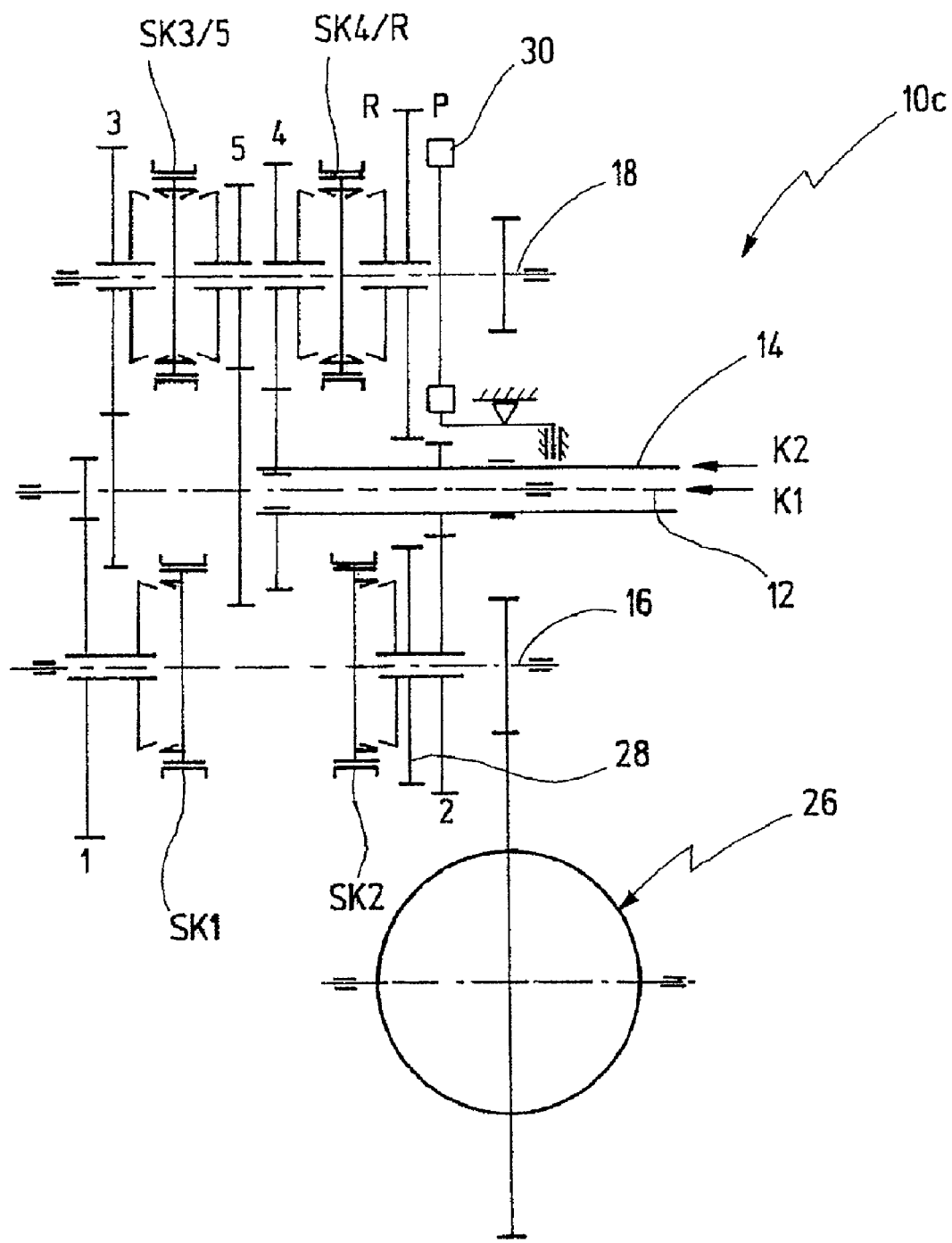
FIG. 5 shows a schematic wheel set diagram of a fourth embodiment of a twin-clutch transmission according to the invention.

FIG. 5 shows another embodiment of a twin-clutch transmission 10c according to the invention.

The twin-clutch transmission 10c has, in contrast to the twin-clutch transmission 10 of FIG. 1, only five forward gears. This is advantageous in particular in low-cost vehicles which do not require six gears. No dual uses are realized, and therefore there are no restrictions with regard to the transmission ratios.

The sequence of the elements on the first output shaft 16 is the following: the first output wheel 20, the loose wheel for the forward gear stage 2, the rotational direction reversal wheel 28, the shift clutch pack SK2, the shift clutch pack SK1, and the loose wheel for the forward gear stage 1.

Arranged on the second output shaft 18 are the following elements: the second output wheel 22, the parking lock 30, the loose wheel of the reverse gear stage R, the shift clutch pack SK4/R, the loose wheel for the forward gear stage 4, the loose wheel for the forward gear stage 5, the shift clutch pack SK3/5, and the loose wheel for the forward gear stage 3.

Figure 6:
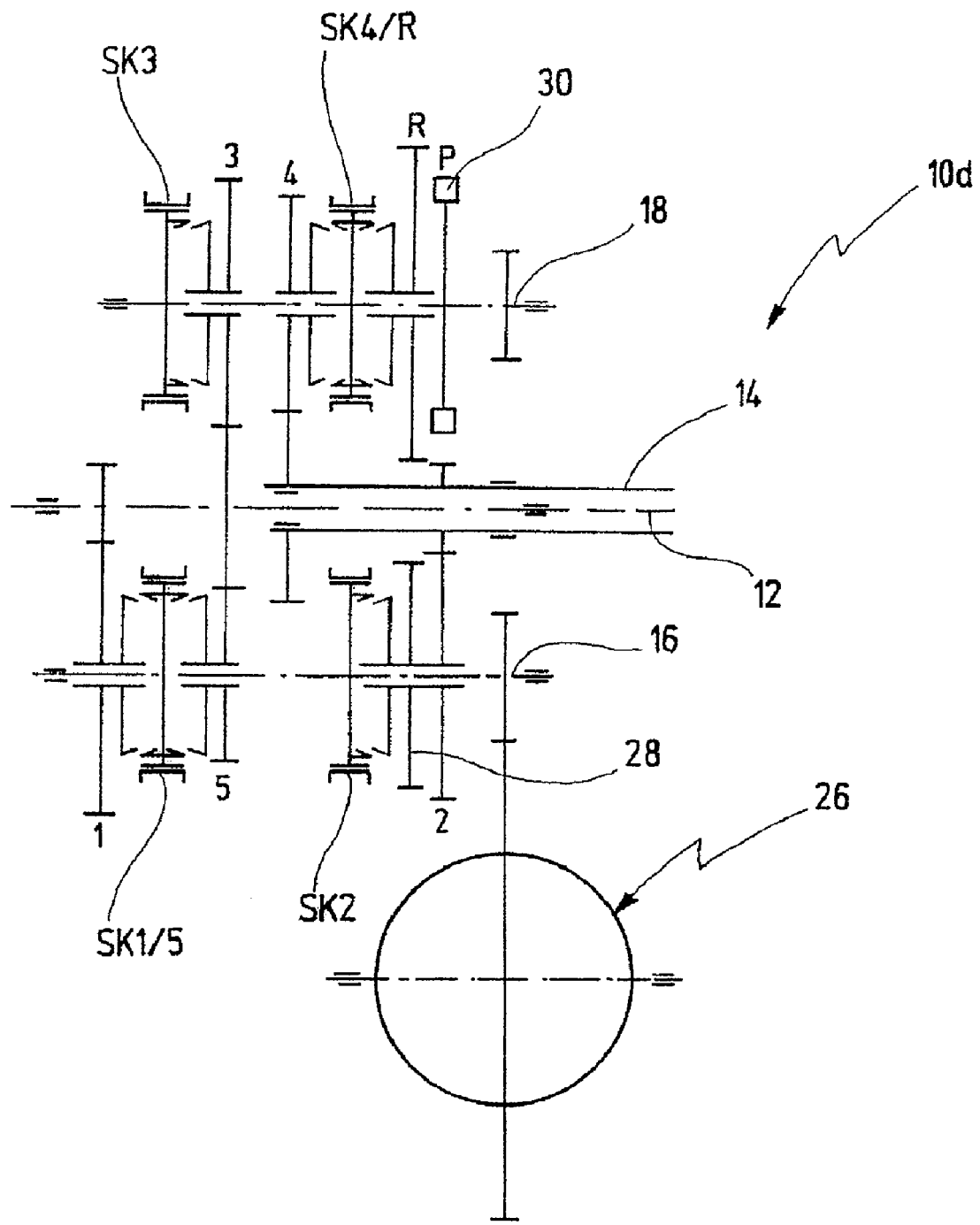
FIG. 6 shows a schematic wheel set diagram of a fifth embodiment of a twin-clutch transmission according to the invention.

FIG. 6 shows a further embodiment of a twin-clutch transmission 10d according to the invention.

The twin-clutch transmission 10d is again a low-cost variant for motor vehicles which do not require six gears. A short overall axial installation length is achieved, since a dual use is realized, specifically for the forward gear stages 3, 5.

The sequence of the elements on the first output shaft 16 is the following: the first output wheel 20, the loose wheel for the forward gear stage 2, the rotational direction reversal wheel 28, the shift clutch pack SK2, the loose wheel for the forward gear stage 5, the shift clutch pack SK1/5, and the loose wheel for the forward gear stage 1.

Arranged on the second output shaft 18 are: the second output wheel 22, the parking lock 30, the loose wheel for the reverse gear stage R, the shift clutch pack SK4/R, the loose wheel for the forward gear stage 4, the loose wheel for the forward gear stage 3, and the shift clutch pack SK3.

Figure 7:
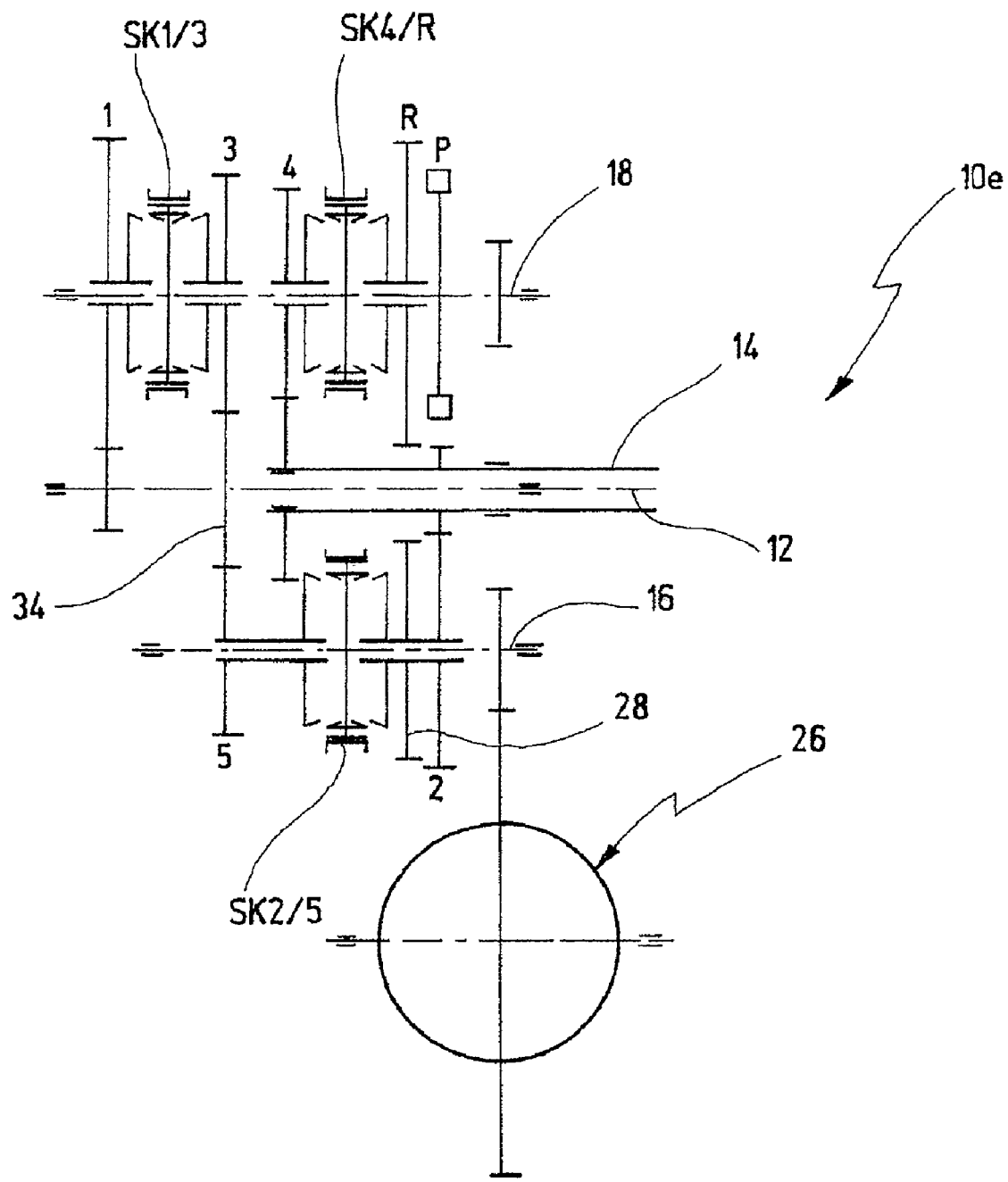
FIG. 7 shows a schematic wheel set diagram of a sixth embodiment of a twin-clutch transmission according to the invention.

FIG. 7 shows a further embodiment of a twin-clutch transmission 10e according to the invention.

This is also a low-cost variant for motor vehicles which do not require six gears. The number of components is again reduced to a minimum. Only three shift clutch packs SK are required. Furthermore, the twin-clutch transmission 10e is particularly short in the axial direction, since a dual use is realized (for gear stages 3, 5).

Arranged on the first output shaft 16 are: the first output wheel 20, the loose wheel for the forward gear stage 2, the rotational direction reversal wheel 28, the shift clutch pack SK2/5, and the loose wheel for the forward gear stage 5.

Arranged on the second output shaft 18 are: the second output wheel 22, the parking lock 30, the loose wheel for the reverse gear stage R, the shift clutch pack SK4/R, the loose wheel for the forward gear stage 4, the loose wheel for the forward gear stage 3, the shift clutch pack SK1/3, and the loose wheel for the forward gear stage 1.

Figure 8:
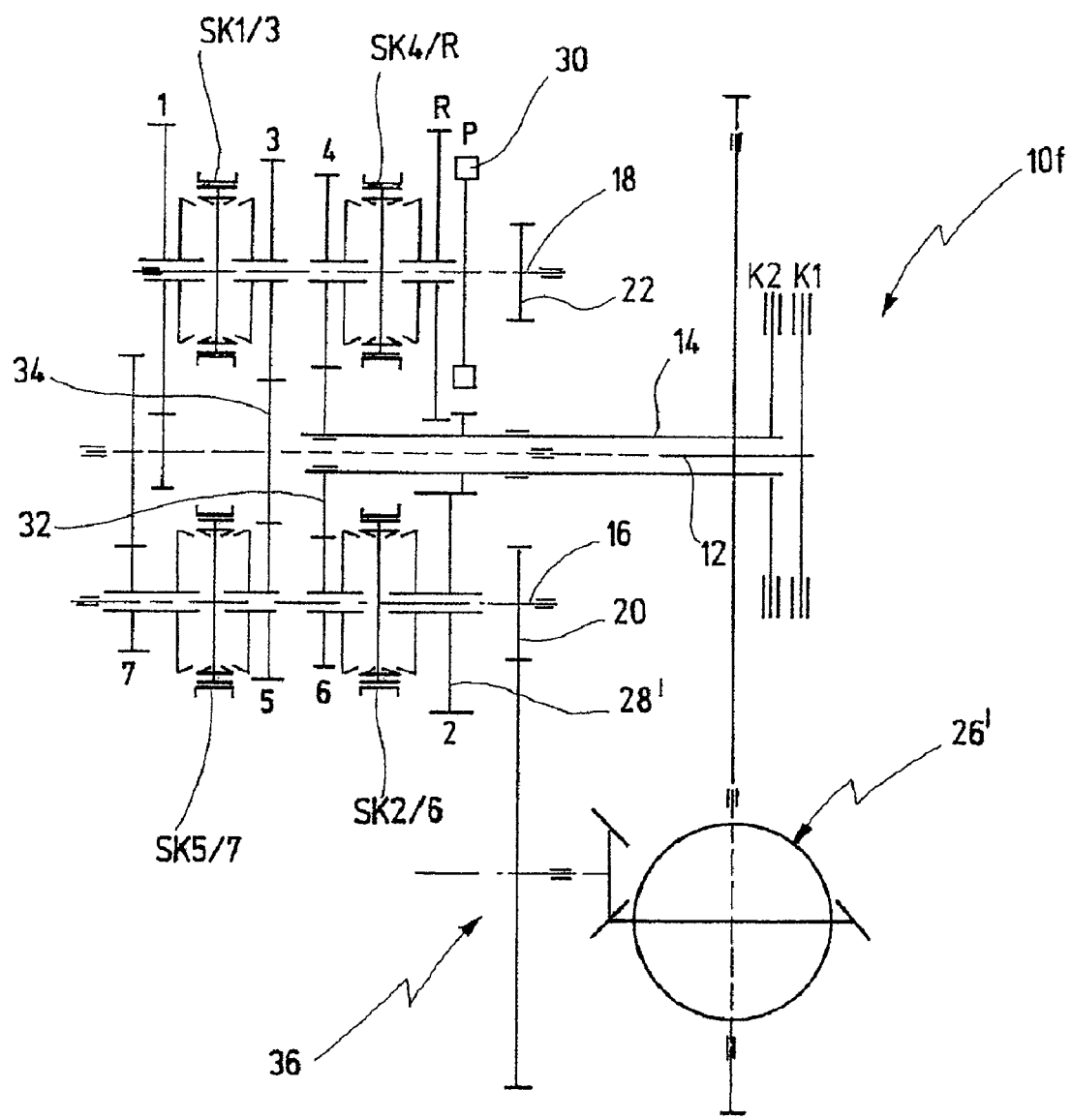
FIG. 8 shows a schematic wheel set diagram of a seventh embodiment of a twin-clutch transmission according to the invention.

FIG. 8 shows a further embodiment of a twin-clutch transmission 10f according to the invention.

The twin-clutch transmission 10f is designed as a 7-gear transmission and contains two dual uses (for the gear stages 3, 5 and 4, 6) and a drive wheel connected downstream.

The transmission is suitable for an inline arrangement and for a front-transverse arrangement.

Arranged on the first output shaft 16 are: the first output wheel 20, the loose wheel 28' for the forward gear stage 2, which loose wheel 28' simultaneously serves as a rotational direction reversal wheel and engages with the loose wheel of the reverse gear stage R on the second output shaft 18, the shift clutch pack SK2/6, the loose wheel for the forward gear stage 6, the loose wheel for the forward gear stage 5, the shift clutch pack SK5/7, and the loose wheel for the forward gear stage 7.

Arranged on the second output shaft 18 are: the second output wheel 22, the parking lock 30, the loose wheel for the reverse gear stage R, the shift clutch pack SK4/R, the loose wheel for the forward gear stage 4, the loose wheel for the forward gear stage 3, a shift clutch pack SK1/3, and the loose wheel for the forward gear stage 1.

The two output wheels 20, 22 are in engagement with a drive wheel 36 which is in turn connected to a differential 26' which is arranged so as to be axially offset.

Figure 9:
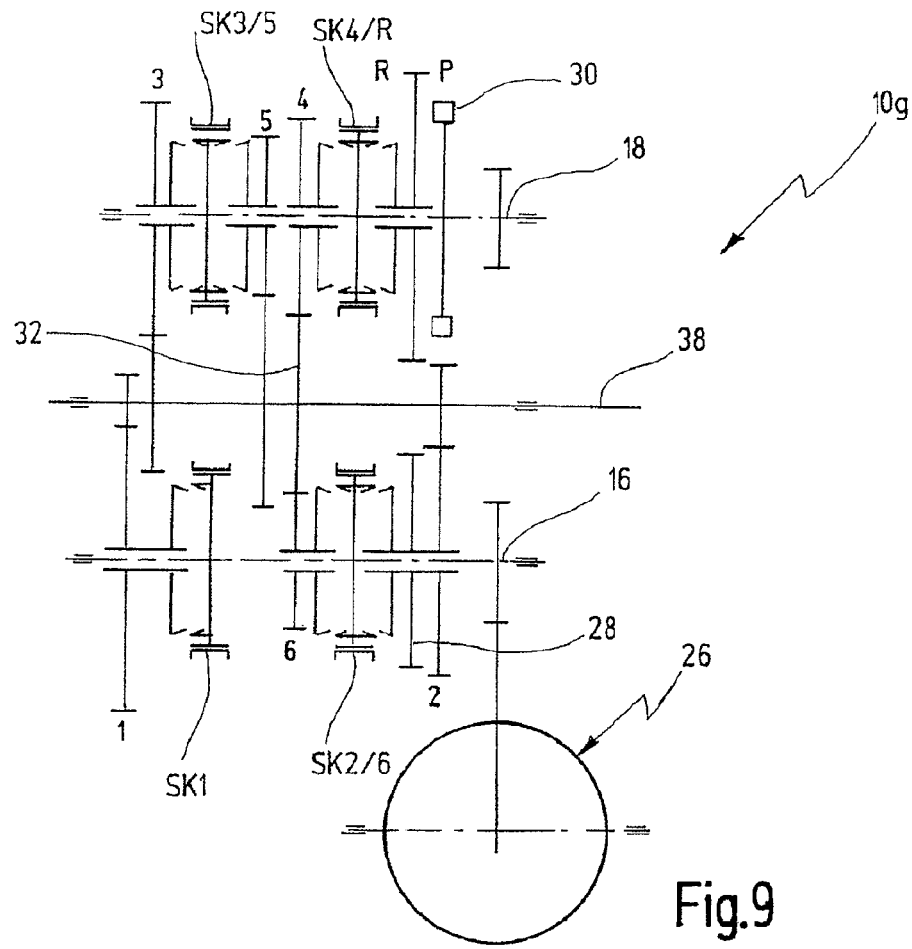
FIG. 9 shows a schematic wheel set diagram of a first embodiment of an automatic shift transmission according to the invention.

In FIG. 9, a first embodiment of an automatic shift transmission is denoted generally by 10g.

The automatic shift transmission 10g corresponds in terms of the wheel set design entirely to the twin-clutch transmission 10 of FIG. 1. The only difference is that the drive input shaft arrangement has only a single drive input shaft 38 to which all of the fixed wheels for the forward gear stages 1-6 are fixed.

Figure 10:
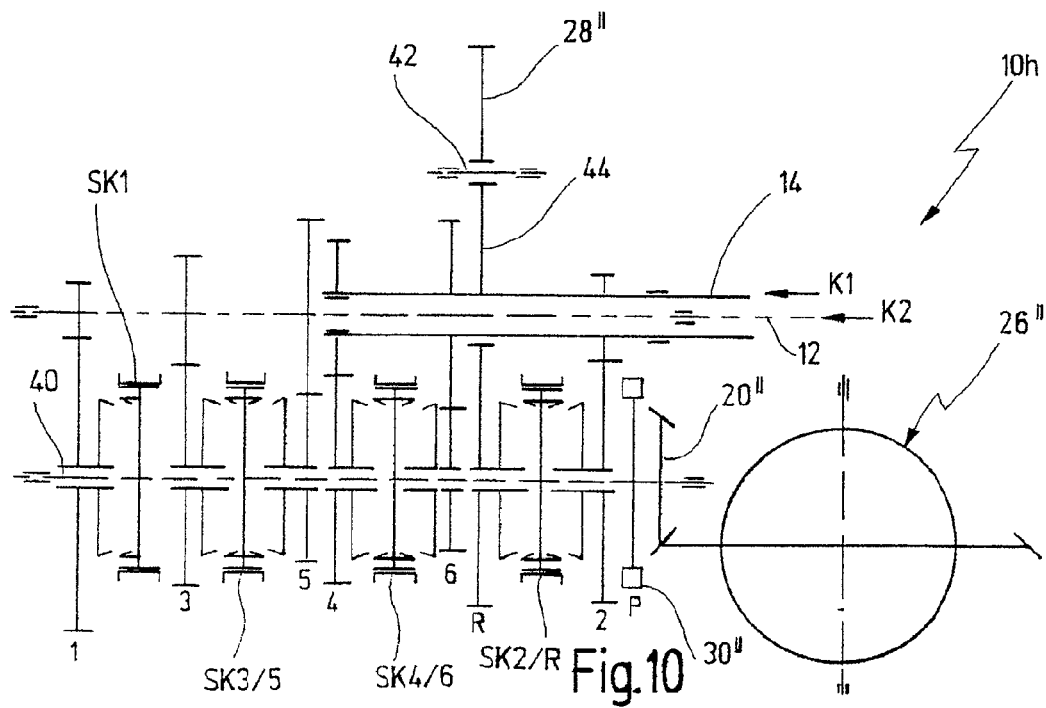
FIG. 10 shows a schematic wheel set diagram of an eighth embodiment of a twin-clutch transmission according to the invention.

In FIG. 10, a further embodiment of a twin-clutch transmission according to the invention is denoted generally by 10h.

The twin-clutch transmission 10h is realized as a 2-shaft transmission and has only a single output shaft 40 which is aligned parallel to the input drive shaft arrangement (composed of the coaxially-arranged drive input shafts 12, 14).

Arranged on the single output shaft 40, in this sequence proceeding from the transmission input, are the following elements: an output wheel 20" which is connected to a differential 26", a parking lock 30", a loose wheel for the forward gear stage 2, a shift clutch pack SK2/R, a loose wheel for the reverse gear stage R, a loose wheel for the forward gear stage 6, a shift clutch pack SK4/6, a loose wheel for the forward gear stage 4, a loose wheel for the forward gear stage 5, a shift clutch pack SK3/5, a loose wheel for the forward gear stage 3, a shift clutch pack SK1, and a loose wheel for the forward gear stage 1.

An additional fixed wheel 44 for the reverse gear stage R is also fixed to the drive input shaft arrangement, more specifically to the drive input shaft 14. Said fixed wheel 44 is in engagement with a rotational direction reversal wheel 28" which is mounted on an auxiliary shaft 42. The auxiliary shaft 42 is arranged parallel to the drive input shaft arrangement 12, 14 and the individual output shaft 40.

The rotational direction reversal wheel 28" is in engagement with the loose wheel for the reverse gear stage R on the output shaft 40.

Since no dual use is realized, the transmission ratios are variable. The forward gear stage 1 and the reverse gear stage R are assigned to different partial transmissions.

What is claimed is:

1. A step variable transmission for a motor vehicle, wherein the step variable transmission has a plurality of forward gear stages and at least one reverse gear stage, having:
    a drive input shaft arrangement;
    an output shaft arrangement; and
    a plurality of wheel sets which have loose wheels and fixed wheels, wherein the loose wheels are rotatably mounted on a shaft arrangement and can be rotationally fixedly connected to the shaft arrangement by means of respective shift clutches,
    wherein a first output shaft has a shorter axle spacing to the drive input shaft arrangement than an axle spacing of a second output shaft to the drive input shaft arrangement,
    wherein the output shaft arrangement has two output shafts which, together with the input drive shaft arrangement, form a 3-shaft arrangement, and
    wherein the first forward gear stage is assigned to the output shaft with the shorter axle spacing.

2. The step variable transmission as claimed in claim 1, wherein the step variable transmission is a twin-clutch transmission, wherein the drive input shaft arrangement has a first and a second drive input shaft which are assigned to a first and a second partial transmission respectively, and wherein the first partial transmission is assigned odd forward gear stages and the second partial transmission is assigned even gear stages.

3. The step variable transmission as claimed in claim 2, wherein the forward gear stage which is used predominantly for starting the motor vehicle in the forward direction and the reverse gear stage are assigned to different partial transmissions.

4. The step variable transmission as claimed in claim 1, wherein the drive input shaft arrangement has a single drive input shaft.

5. The step variable transmission as claimed in claim 1, wherein a certain forward gear stage is assigned to one output shaft of the output shafts and wherein the reverse gear stage is assigned to the other output shaft.

6. The step variable transmission as claimed in claim 5, wherein the certain forward gear stage is the second forward gear stage.

7. The step variable transmission as claimed in claim 5, wherein the reverse gear stage is driven via the certain forward gear stage.

8. The step variable transmission as claimed in claim 7, wherein the reverse gear stage is driven directly via the certain forward gear stage.

9. The step variable transmission as claimed in claim 7, wherein the reverse gear stage is driven via a wheel which is rotationally fixedly connected to a loose wheel of a wheel set which is assigned to the certain forward gear stage.

10. The step variable transmission as claimed in claim 1, wherein a parking lock is assigned to one of the output shafts.

11. The step variable transmission as claimed in claim 10, wherein the parking lock is aligned in the axial direction with a certain forward gear stage of the other output shaft.

12. The step variable transmission as claimed in one of claims 11, wherein the certain forward gear stage is the second forward gear stage.

13. The step variable transmission as claimed in claim 1, wherein the first forward gear stage and the second forward gear stage are assigned to one of the two output shafts.

14. The step variable transmission as claimed in claim 1, wherein those wheel sets which are assigned to the forward gear stages which have a relatively large shift wheel diameter are arranged at the ends of the output shaft arrangement.

15. A step variable transmission for a motor vehicle, the step variable transmission having a drive input shaft arrangement, an output shaft arrangement, and a plurality of wheel sets for establishing a plurality of forward gear stages and at least one reverse gear stage, wherein the output shaft arrangement has two output shafts which, together with the drive input shaft arrangement form a 3-shaft arrangement, wherein a certain forward gear stage is assigned to one drive output shaft of the output drive shafts and wherein the reverse gear stage is assigned to the other drive output shaft, wherein the reverse gear stage is driven via a wheel which is rotationally fixedly connected to a loose wheel of a wheel set which is assigned to the certain forward gear stage, wherein a parking lock is assigned to one of the drive output shafts, and wherein the parking lock is aligned in the axial direction with a certain forward gear stage of the other drive output shaft, wherein a first output shaft has a shorter axle spacing to the drive input shaft arrangement than an axle spacing of the second output shaft to the drive input shaft arrangement,
    wherein the first forward gear stage is assigned to the drive output shaft with the shorter axle spacing.

16. The step variable transmission as claimed in claim 15, wherein the certain forward gear stage is the second forward gear stage.

17. A step variable transmission for a motor vehicle, wherein the step variable transmission has a drive input shaft arrangement, an output shaft arrangement, and a plurality of wheel sets for establishing a plurality of forward gear stages and at least one reverse gear stage, wherein the step variable transmission is a twin-clutch transmission, wherein the drive input shaft arrangement has a first and a second drive input shaft which are assigned to a first and a second partial transmission respectively, and wherein the first partial transmission is assigned odd forward gear stages and the second partial transmission is assigned even gear stages, wherein the forward gear stage which is used predominantly for starting the motor vehicle in the forward direction and the reverse gear stage are assigned to different partial transmissions, wherein the output shaft arrangement has two output shafts which, together with the input drive shaft arrangement, form a 3-shaft arrangement, wherein a certain forward gear stage is assigned to one output shaft of the output shafts and wherein the reverse gear stage is assigned to the other output shaft, wherein the reverse gear stage is driven via the certain forward gear stage that is not the starting forward gear stage, and wherein the reverse gear stage is driven via a wheel which is rotationally fixedly connected to a loose wheel of a wheel set which is assigned to the certain forward gear stage, wherein a first output shaft has a shorter axle spacing to the drive input shaft arrangement than an axle spacing of the second output shaft to the drive input shaft arrangement, wherein the first forward gear stage is assigned to the drive output shaft with the shorter axle spacing.

18. The step variable transmission as claimed in claim 17, wherein a parking lock is assigned to one of the output shafts.

19. The step variable transmission as claimed in claim 18, wherein the parking lock is aligned in the axial direction with the certain forward gear stage.

20. The step variable transmission as claimed in claim 17, wherein the certain forward gear stage is the second forward gear stage.

21. The step variable transmission as claimed in claim 17, wherein the first forward gear stage and the second forward gear stage are assigned to one of the two output shafts.

* * * * *